(12) United States Patent
Castang

(10) Patent No.: US 11,828,307 B2
(45) Date of Patent: Nov. 28, 2023

(54) METHOD AND SYSTEM FOR DETECTING, ISOLATING AND ESTIMATING A DEGRADATION OF A CORRESPONDING COMPONENT OF AN ACTUATOR

(71) Applicant: THALES CANADA INC., Toronto (CA)

(72) Inventor: Fabien Castang, Toronto (CA)

(73) Assignee: THALES CANADA INC., Toronto (CA)

( * ) Notice: Subject to any disclaimer, the term of this patent is extended or adjusted under 35 U.S.C. 154(b) by 202 days.

(21) Appl. No.: 17/312,142

(22) PCT Filed: Jan. 7, 2020

(86) PCT No.: PCT/IB2020/050094
§ 371 (c)(1),
(2) Date: Jun. 9, 2021

(87) PCT Pub. No.: WO2020/144580
PCT Pub. Date: Jul. 16, 2020

(65) Prior Publication Data
US 2022/0042527 A1 Feb. 10, 2022

Related U.S. Application Data

(60) Provisional application No. 62/789,791, filed on Jan. 8, 2019.

(51) Int. Cl.
*F15B 19/00* (2006.01)
*G05B 19/042* (2006.01)
*G05B 23/02* (2006.01)

(52) U.S. Cl.
CPC ........ *F15B 19/005* (2013.01); *G05B 19/0425* (2013.01); *G05B 23/0235* (2013.01); *G05B 23/0254* (2013.01); *G05B 2219/24015* (2013.01)

(58) Field of Classification Search
CPC ........ F15B 19/005; F15B 21/087; F15B 9/03; F15B 13/043; F15B 15/088; F15B 15/18;
(Continued)

(56) References Cited

U.S. PATENT DOCUMENTS 7,377,480 B2   5/2008   Tabor et al.
7,970,583 B2   6/2011   Novis et al.
(Continued)

FOREIGN PATENT DOCUMENTS

JP   2005067276 A   3/2005
JP   2009-294147 A   12/2009

OTHER PUBLICATIONS

Wang et al., "Adaptive unknown input observer approach for aircraft actuator fault detection and isolation," Int. J. Adapt. Control Signal Process, 2007:21:31-48.
(Continued)

*Primary Examiner* — Mohammad K Islam
(74) *Attorney, Agent, or Firm* — HAUPTMAN HAM, LLP

(57) ABSTRACT

A method and a system are disclosed for detecting, isolating and estimating a degradation of a corresponding component of an actuator controlled by an actuator command signal, the method comprising obtaining a control signal of the actuator; obtaining a signal indicative of a displacement of the actuator; computing an envelope of admissible values for the displacement of the actuator; determining if the displacement of the actuator is outside the computed envelope and in the case where the displacement of the actuator is outside the computed enveloped computing an estimation of each parameter and state of the actuator; identifying at least one corresponding parameter responsible for causing the actua-
(Continued)

tor displacement to be outside the computer envelope and providing an indication of the at least one corresponding parameter.

11 Claims, 8 Drawing Sheets

(58) Field of Classification Search
CPC ...... F15B 2211/6336; F15B 2211/6656; F15B 2211/864; G05B 19/0425; G05B 23/0235; G05B 23/0254; G05B 2219/24015
See application file for complete search history.

(56) References Cited

U.S. PATENT DOCUMENTS

| | | | |
|---|---|---|---|
| 9,163,387 B2 | 10/2015 | Yuan et al. | |
| 9,205,560 B1* | 12/2015 | Edsinger | B25J 9/1674 |
| 9,428,279 B2 | 8/2016 | Ganguli et al. | |
| 2009/0222124 A1* | 9/2009 | Latwesen | F16K 37/0083 |
| | | | 700/109 |
| 2010/0207344 A1* | 8/2010 | Nakamura | B60G 13/16 |
| | | | 280/124.108 |
| 2010/0286959 A1 | 11/2010 | Novis et al. | |
| 2011/0288791 A1* | 11/2011 | Jeppesen | G01N 3/38 |
| | | | 702/42 |
| 2016/0047392 A1* | 2/2016 | Bernocchi | F04D 17/10 |
| | | | 415/17 |
| 2018/0340554 A1 | 11/2018 | Hutchison et al. | |

OTHER PUBLICATIONS

Peng et al., "Oscillatory failure case detection in the missile Actuators electrical flight control system by adaptive unknown input observer," The 30th Chinese Control and Decision Conference (2018 CCDC), pp. 2557-2562.
Japanese Office Action issued in corresponding Japanese Application No. 2021-540042, dated Oct. 11, 2022, pp. 1-3.
Extended European Search Report issued in corresponding European Application No. 20738954.5, dated Oct. 17, 2022, pp. 1-11.
International Search Report and Written Opinion from corresponding International Application No. PCT/IB2020/050094, dated Apr. 8, 2020, pp. 1-6, Canadian Intellectual Property Office, Quebec, Canada.

* cited by examiner

US 11,828,307 B2

METHOD AND SYSTEM FOR DETECTING, ISOLATING AND ESTIMATING A DEGRADATION OF A CORRESPONDING COMPONENT OF AN ACTUATOR

CROSS-REFERENCE TO RELATED APPLICATION

This application claims priority on U.S. Provisional Application No. 62/789,791, filed on Jan. 8, 2019.

FIELD

One or more embodiments of the invention relate to the field of monitoring actuators. More precisely, one or more embodiments of the invention pertain to a method and system for detecting, isolating and estimating a degradation of a corresponding component of an actuator.

BACKGROUND

Being able to monitor an actuator is of great interest.

Unfortunately prior art methods for monitoring actuators suffer from many limitations.

For instance, a limitation with prior art methods is that they are not able to detect a degradation of a component of an actuator.

Another limitation of the prior-art methods is that they are complex and are usually limited a given specific actuator.

There is a need for a method and system that will overcome at least one of the above-identified drawbacks.

Features of the invention will be apparent from review of the disclosure, drawings and description of the invention below.

BRIEF SUMMARY

According to a broad aspect, there is disclosed a system for detecting, isolating and estimating a degradation of a corresponding component of an actuator controlled by an actuator command signal, the actuator providing a signal indicative of a displacement of said actuator, the system comprising a memory unit for storing actuator parameter data; a sensor monitoring unit operatively connected to the memory unit and receiving the actuator command signal, the signal indicative of a displacement of said actuator, the sensor monitoring unit determining a presence of a given oscillation in the signal indicative of a displacement of said actuator; a trigger unit operatively connected to the sensor monitoring unit and to the memory unit and receiving the actuator command signal, the signal indicative of a displacement of said actuator; the trigger unit for computing an envelope of admissible values and for determining if the signal indicative of a displacement of said actuator is outside the computed envelope of admissible values; a parameter and state estimation unit operatively connected to the sensor monitoring unit and to the memory unit and further receiving the actuator command signal, the signal indicative of a displacement of said actuator; the parameter and state estimation unit for estimating each corresponding parameter and state of the actuator; an isolation unit operatively connected to the parameter and state estimation unit and to the trigger unit, the isolation unit for determining and for providing at least one parameter of the actuator responsible for the displacement of said actuator to be outside the given envelope of admissible values and further wherein the memory unit is updated with a value of the at least one corresponding parameter responsible for the displacement of said actuator to be outside the given envelope of admissible values.

In accordance with one or more embodiments, the actuator further provides a signal indicative of a displacement of a surface actuated by the actuator; further wherein the sensor monitoring unit receives the signal indicative of a displacement of a surface actuated by the actuator and determines a presence of a given oscillation in the signal indicative of a displacement of a surface actuated by the actuator and at least one of a bias and a drift in at least one of the signal indicative of a displacement of the actuator and the signal indicative of a displacement of a surface actuated by the actuator.

In accordance with one or more embodiments, the envelope of admissible values is computed dynamically.

In accordance with one or more embodiments, the actuator is selected in a group consisting of electro hydraulic servo actuators (EHSA) and electric backup hydraulic actuators (EBHA).

In accordance with one or more embodiments, the actuator is comprised of a sensor further wherein the system is used for determining a degradation of the sensor.

In accordance with a broad aspect, there is disclosed a system for detecting, isolating and estimating a degradation of a corresponding component of an actuator controlled by an actuator command signal, the actuator providing a signal indicative of a displacement of said actuator and a signal indicative of a displacement of a surface actuated by the actuator, the system comprising a memory unit for storing actuator data; a sensor monitoring unit operatively connected to the memory unit and receiving the actuator command signal, the signal indicative of a displacement of said actuator and the signal indicative of a displacement of a surface actuated by the actuator, the sensor monitoring unit determining a presence of a given oscillation in at least one of the actuator command signal, the signal indicative of a displacement of said actuator and the signal indicative of a displacement of a surface actuated by the actuator as well as at least one of a bias and a drift in at least one of the signal indicative of a displacement of said actuator and the signal indicative of a displacement of a surface actuated by the actuator; a trigger unit operatively connected to the sensor monitoring unit and to the memory unit and receiving the actuator command signal, the signal indicative of a displacement of said actuator and the signal indicative of a displacement of a surface actuated by the actuator; the trigger unit for determining if a position of the actuator is outside a given envelope of admissible values; at least one estimated parameter unit, each of the at least one estimated parameter unit operatively connected to the sensor monitoring unit and to the memory unit and further receiving the actuator command signal, the signal indicative of a displacement of said actuator, the signal indicative of a displacement of a surface actuated by the actuator; each estimated parameter unit for estimating one of a corresponding parameter or a state of the actuator; an isolation unit operatively connected to each of the at least one estimated parameter unit and to the trigger unit, the isolation unit for determining and for providing at least one of a corresponding parameter and a corresponding state of the actuator responsible for the position of the actuator to be outside the given envelope; and further wherein the memory unit is updated with a value of the at least one of a corresponding parameter and a corresponding state of the actuator responsible for the position of the actuator to be outside the given envelope.

In accordance with a broad aspect, there is disclosed a method for detecting, isolating and estimating a degradation of a corresponding component of an actuator controlled by an actuator command signal, the method comprising obtaining a control signal of the actuator; obtaining a signal indicative of a displacement of the actuator; computing an envelope of admissible values for the displacement of the actuator; determining if the displacement of the actuator is outside the computed envelope; in the case where the displacement of the actuator is outside the computed enveloped computing an estimation of each parameter and state of the actuator, identifying at least one corresponding parameter responsible for causing the actuator displacement to be outside the computer envelope, and providing an indication of the at least one corresponding parameter responsible for causing the displacement to be outside the computed envelope.

In accordance with one or more embodiments, the actuator is controlled in position; further wherein the control signal is a position control signal.

In accordance with one or more embodiments, the actuator is controlled in speed; further wherein the control signal is a speed control signal.

In accordance with one or more embodiments, a signal indicative of a displacement of a surface actuated by the actuator is further obtained.

In accordance with one or more embodiments, the computing of the envelope of admissible values for the displacement of the actuator is performed dynamically.

In accordance with a broad aspect, there is disclosed a non-transitory computer readable storage medium for storing computer-executable instructions which, when executed, cause a computer to perform a method for detecting, isolating and estimating a degradation of a corresponding component of an actuator controlled by an actuator command signal, the method comprising obtaining a control signal of the actuator; obtaining a signal indicative of a displacement of the actuator; computing an envelope of admissible values for the displacement of the actuator; determining if the displacement of the actuator is outside the computed envelope; in the case where the displacement of the actuator is outside the computed enveloped computing an estimation of each parameter and state of the actuator, identifying at least one corresponding parameter responsible for causing the actuator displacement to be outside the computer envelope, and providing an indication of the at least one corresponding parameter responsible for causing the displacement to be outside the computed envelope.

One or more embodiments of the method disclosed herein are of great advantage for various reasons.

More precisely, a first reason is that one or more embodiments of the method and the system for detecting, isolating and estimating a degradation of a corresponding component of an actuator provide an indication of a degradation of a component. It is therefore possible to anticipate a failure before it occurs, which is of great advantage.

A second reason is that one or more embodiments of the method and the system for detecting, isolating and estimating a degradation of a corresponding component of an actuator are not dependent on a specific actuator architecture and may be implemented for various types of architectures provided the mathematical model is known.

A third reason is that an estimated degradation of a corresponding component is logged and re-injected on all the mathematical models in order to adjust all the mathematical models accordingly.

BRIEF DESCRIPTION OF THE DRAWINGS

In order that the invention may be readily understood, one or more embodiments of the invention are illustrated by way of example in the accompanying drawings.

FIG. 3b is a diagram which shows a closed-loop equivalent to the mass-spring damping system shown in FIG. 3a.

FIG. 4 is a diagram which shows an embodiment of a system for detecting, isolating and estimating a degradation of a corresponding component of the mass-spring damping system shown in FIG. 3a.

Figure 1:
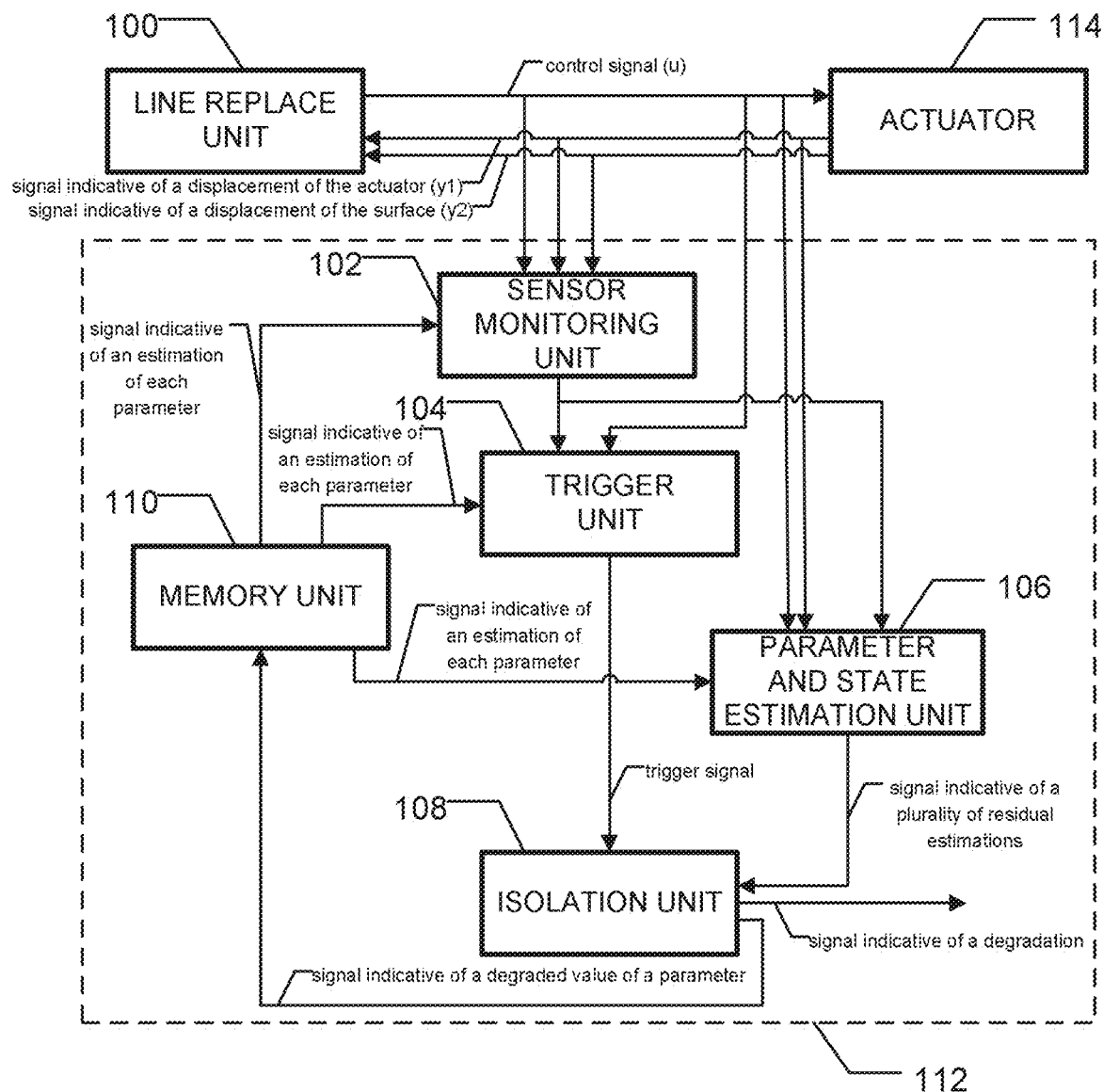
FIG. 1 is a diagram which shows an embodiment of a system for detecting, isolating and estimating a degradation of a corresponding component of an actuator.

Further details of one or more embodiments of the invention and its advantages will be apparent from the detailed description included below.

DETAILED DESCRIPTION

In the following description of the embodiments, references to the accompanying drawings are by way of illustration of an example by which the invention may be practiced.

Terms

The term "invention" and the like mean "the one or more inventions disclosed in this application," unless expressly specified otherwise.

The terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the disclosed invention(s)," unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an" and "the" mean "one or more," unless expressly specified otherwise.

The term "plurality" means "two or more," unless expressly specified otherwise.

The term "herein" means "in the present application, including anything which may be incorporated by reference," unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example," and thus do not limit the terms or phrases they explain.

The term "i.e." and like terms mean "that is," and thus limit the terms or phrases they explain.

Neither the Title nor the Abstract is to be taken as limiting in any way as the scope of the disclosed invention(s). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed one or more embodiments of the invention(s) are widely applicable to numerous embodiments, as is readily apparent from the disclosure. One of ordinary skill in the art will recognize that the disclosed one or more embodiments of the invention(s) may be practiced with various modifications and alterations, such as structural and logical modifications. Although particular features of the disclosed one or more embodiments of the invention(s) may be described with reference to one or more particular embodiments and/or drawings, it should be understood that such features are not limited to usage in the one or more particular embodiments or drawings with reference to which they are described, unless expressly specified otherwise.

With all this in mind, one or more embodiments of the present invention are directed to a method and a system for detecting, isolating and estimating a degradation of a corresponding component of an actuator.

It will be appreciated that the system may be used in various configurations.

For instance, in one configuration, the system is used in a configuration wherein the actuator is an electro hydraulic servo actuator (EHSA). In an alternative embodiment, the system is used in a configuration wherein the actuator is an electric backup hydraulic actuator (EBHA).

In fact, it will be appreciated that the actuator may be of various types. For instance, the actuator may be a combination of an actuator and a sensor. It will be appreciated that in an alternative embodiment, the system is used for determining a degradation of the sensor.

Figure 3A:
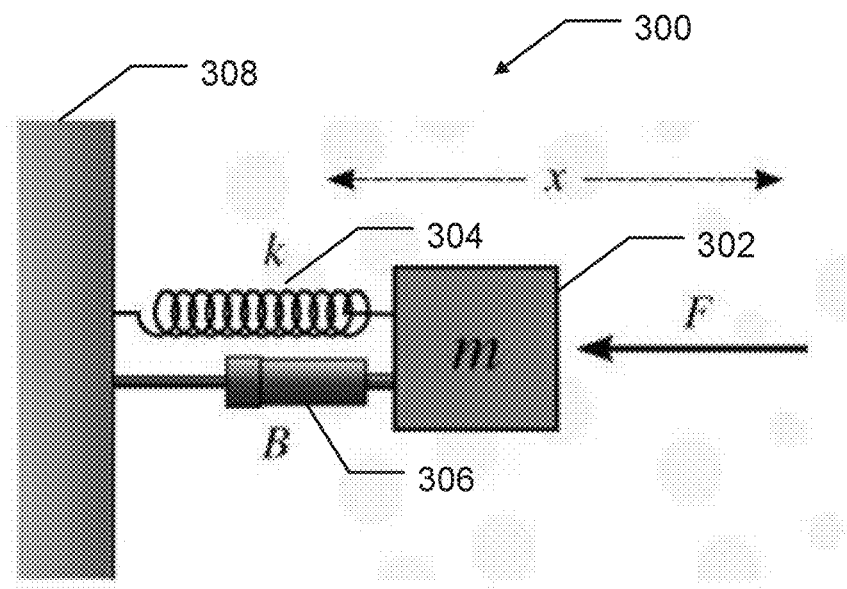
FIG. 3a is a diagram which shows an embodiment of a mass-spring damping system which may be used with the system for detecting, isolating and estimating a degradation of a corresponding component of an actuator.
Figure 4:
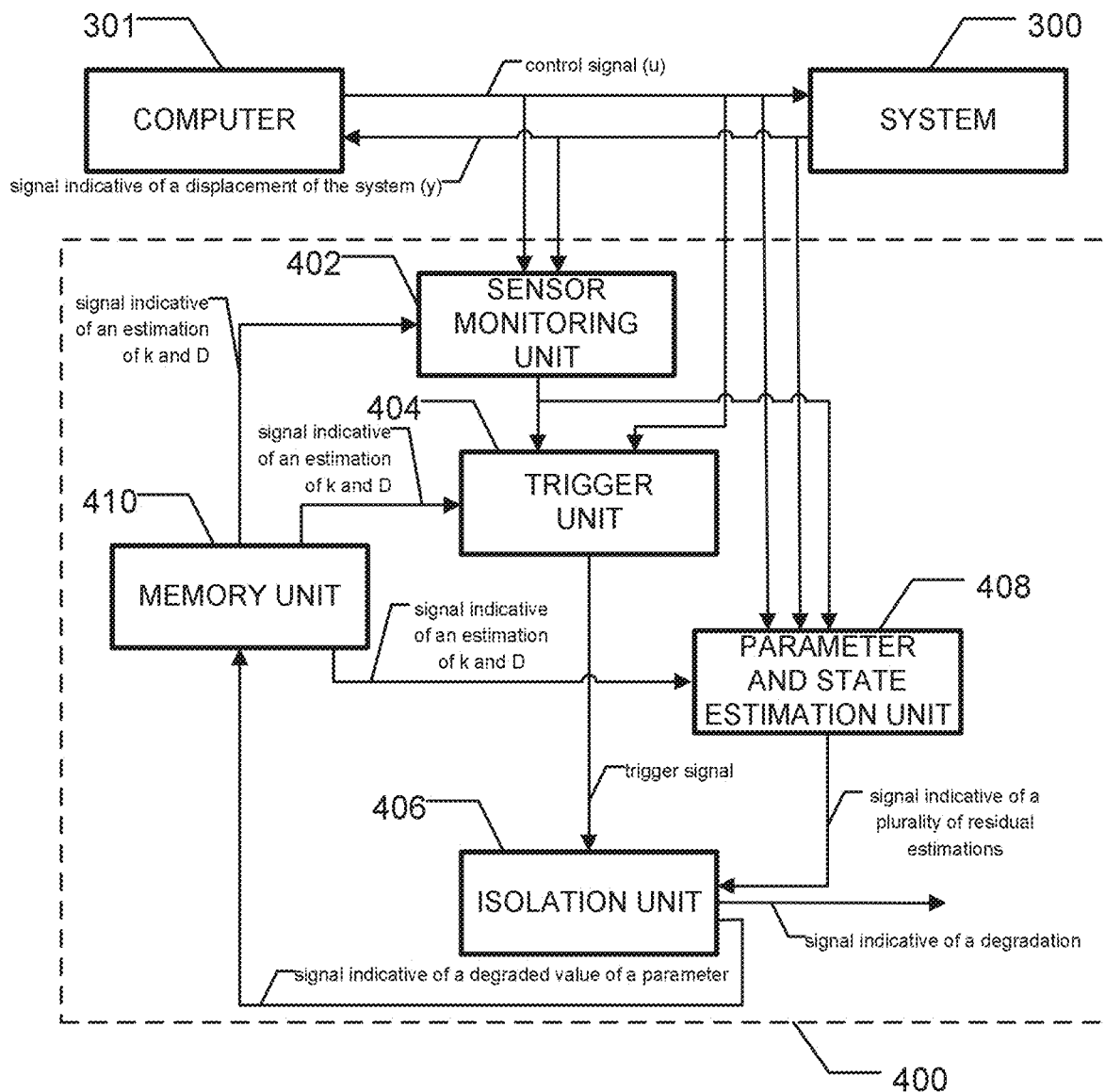
Figure 5:
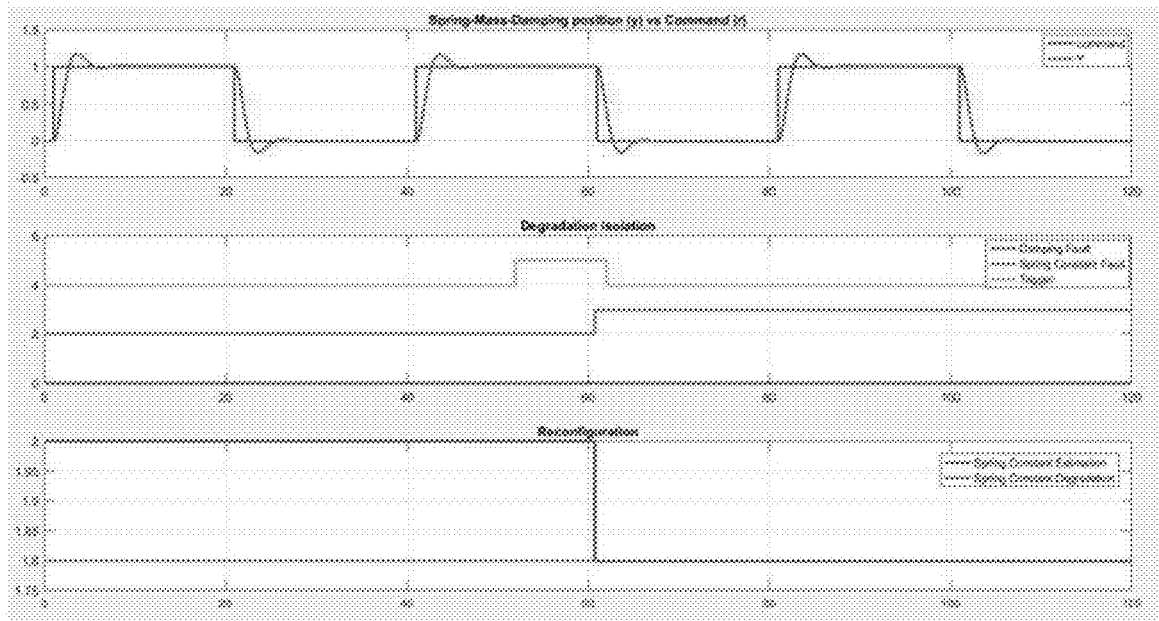
FIG. 5 shows a graph which displays a mass-spring damping position versus a command over time, a graph which shows a degradation isolation over time and a graph which shows a reconfiguration over time.

In order to further illustrate the invention, an embodiment is disclosed at FIG. 3a of a mass-spring damper system 300 which may be monitored using an embodiment of the system for detecting, isolating and estimating a degradation of a corresponding component of an actuator shown in FIG. 4.

In this embodiment, the position of the mass-spring damper system 300 is controlled by a computer, not shown. The mass-spring damper system 300 comprises a mass 302, a spring 304 and a damper 306. It will be appreciated that the mass 302 is connected to a fixed base 308 via the spring 304. The damper 306 is mounted in parallel with the spring 304 to the fixed base 308.

The mass 302 is characterized by a mass m.

The spring 304 is characterized by a spring constant k.

The damper 306 is characterized by a damping B.

It will be appreciated that the mass-spring damper system 300 therefore comprises two components which may be subject to a degradation, i.e., the spring 304 and the damper 306. Each component is characterized by a corresponding parameter, i.e., the spring constant k for the spring 304 and the damping B for the damper 306. The purpose of the system for detecting, isolating and estimating a degradation of a corresponding component of an actuator is therefore in this embodiment to detect, isolate and estimate a degradation of at least one of the spring 304 and the damper 306.

Figure 3B:
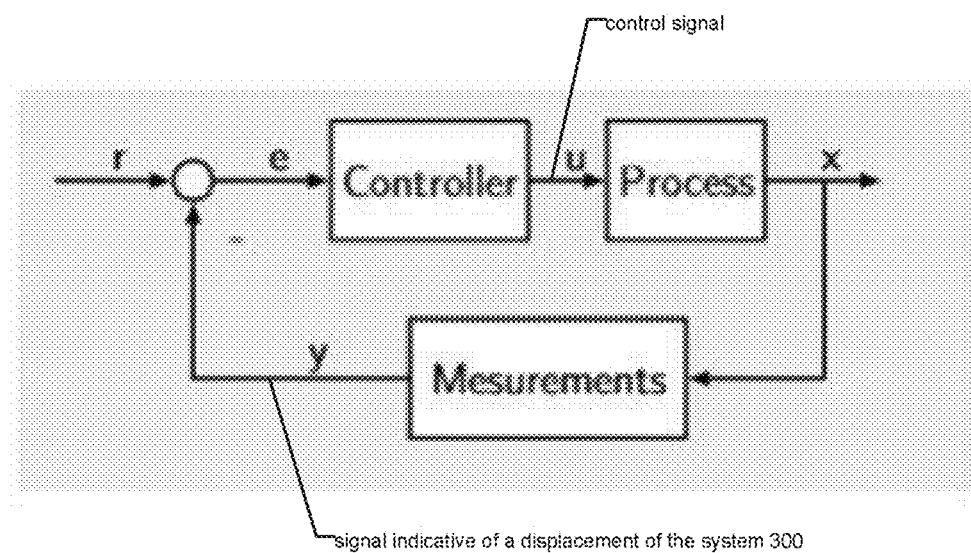

Now referring to FIG. 3b, there is shown a diagram which shows a closed loop equivalent of the mass-spring damper system 300 shown in FIG. 3a.

In this embodiment, y is a signal indicative of a displacement of the system 300 and x is a signal indicative of a position of the mass-spring damper system 300.

r is a command signal and u is a control signal.

e is an error signal equal to a difference between the command signal r and the signal indicative of a displacement of the system 300.

As further explained below, it will be appreciated that in, order to work, a mathematical model or modelization of the actuator is required by the system for detecting, isolating and estimating a degradation of a corresponding component of an actuator. The skilled addressee will appreciate that the mathematical modelization of the actuator may be provided according to various embodiments. It will be appreciated that the mathematical modelization of the actuator is a formula which comprises at least each of the corresponding parameter to monitor of the actuator as well as the control signal u and the actuator position signal if the actuator is controlled with a position control signal.

In the embodiment of the mass-spring damper system 300 shown in FIG. 3a, the equation is $$\ddot{x} = \frac{1}{M}(-B\dot{x} - \acute{k}x + u),$$

wherein B is the damping of the damper 306, k is the spring constant of the spring 304, M is the mass 302, $\ddot{x}$ is the acceleration and $\dot{x}$ is the speed.

Now referring back to FIG. 1, it will be appreciated that a line replaceable unit (LRU) 100 provides a control signal u to an actuator 114. The control signal u provided to the actuator 114 is used for controlling the actuator 114. In one embodiment, the control signal u is used for controlling a position of the actuator 114. In another alternative embodiment, the control signal u is used for controlling a speed of the actuator 114.

The actuator 102 provides a signal indicative of a displacement of the actuator 114 y1 and a signal indicative of a displacement of a surface actuated by the actuator 114 y2.

A system 112 is used for detecting, isolating and estimating a degradation of a corresponding component of the actuator 114.

It will be appreciated that the system 112 for detecting, isolating and estimating a degradation of a corresponding component of the actuator 114 comprises a sensor monitoring unit 102, a trigger unit 104, a parameter and state estimation unit 106, an isolation unit 108 and a memory unit 110.

More precisely, the sensor monitoring unit 102 is used for determining a presence of a given oscillation in at least one of the signal indicative of a displacement of the actuator 114 y1 and the signal indicative of a displacement of a surface actuated by the actuator 114 y2.

The sensor monitoring unit 102 is further used for determining a presence of at least one of a bias and a drift in at least one of the signal indicative of a displacement of the actuator 114 y1 and the signal indicative of a displacement of a surface actuated by the actuator 114 y2.

Now referring to FIG. 4, it will be appreciated that, in the embodiment of the mass-spring damper system 300 shown in FIG. 3a, the system 400 for detecting, isolating and estimating a degradation of a corresponding component of the actuator comprises a sensor monitoring unit 402, a trigger unit 404, a parameter and state estimation unit 408, an isolation unit 406 and a memory unit 410.

It will be appreciated that the sensor monitoring unit 402 is used for determining a presence of a given oscillation in the signal indicative of a displacement of the system 300 y. It will be appreciated that the detection of the oscillation in the signal indicative of a displacement of the system 300 y may be performed according to various embodiments.

In one embodiment, the detection of the oscillation is performed using a 3 order Butterworth notch filter, a threshold device operatively connected to the output of the 3 order Butterworth notch filter and a counter operatively connected to the output of the counter.

The skilled addressee will appreciate that many various alternative embodiments may be possible for performing a detection of an oscillation in the signal indicative of a displacement of the system 300 y.

More precisely, the 3 order Butterworth notch filters the signal indicative of a displacement of the system 300 y and provides a corresponding filtered signal indicative of a displacement of the system 300 y.

The filtered signal indicative of a displacement of the system 300 y is provided to the threshold device which is operatively connected to the output of the 3 order Butterworth notch filter.

It will be appreciated that the threshold device outputs a signal when a corresponding input signal exceeds a given threshold.

It will be appreciated that the purpose of the counter is to count how many times the filtered signal indicative of a displacement of the system 300 y exceeds the given threshold. It will be appreciated that the given threshold may be defined according to various embodiments, known to the skilled addressee.

The counter is therefore used for determining a frequency of exceedance of the given threshold in the filtered signal indicative of a displacement of the system 300 y.

As mentioned earlier, it will be appreciated that the corresponding sensor monitoring unit 102 is also used for determining at least one of a bias and a drift in the signal indicative of a displacement of the actuator 114 y1 and in the signal indicative of a displacement of a surface actuated by the actuator 114 y2.

It will be appreciated that a bias as well as a drift are known to the skilled addressee.

In fact, it will be appreciated that two sensors are required in order to evaluate the sensors bias and the drift. As a matter of fact, it will be appreciated that a first sensor measures a displacement of the actuator 114 and provides the corresponding signal indicative of a displacement of the actuator 114 y1, while a second sensor is used for measuring the displacement of the surface actuated by the actuator 114 and for providing the corresponding signal indicative of a displacement of a surface actuated by the actuator 114 y2.

More precisely, it will be appreciated that the mathematical model or modelization of the actuator 114 mentioned above is used. It will be appreciated that the mathematical model comprises each of the corresponding parameters of the components of the actuator to monitor, the control signal u, as well as at least one of a measured position of the actuator in the case where the control signal u is a position control signal and a measured speed of the actuator in the case where the control signal u is a speed control signal.

Figure 6:
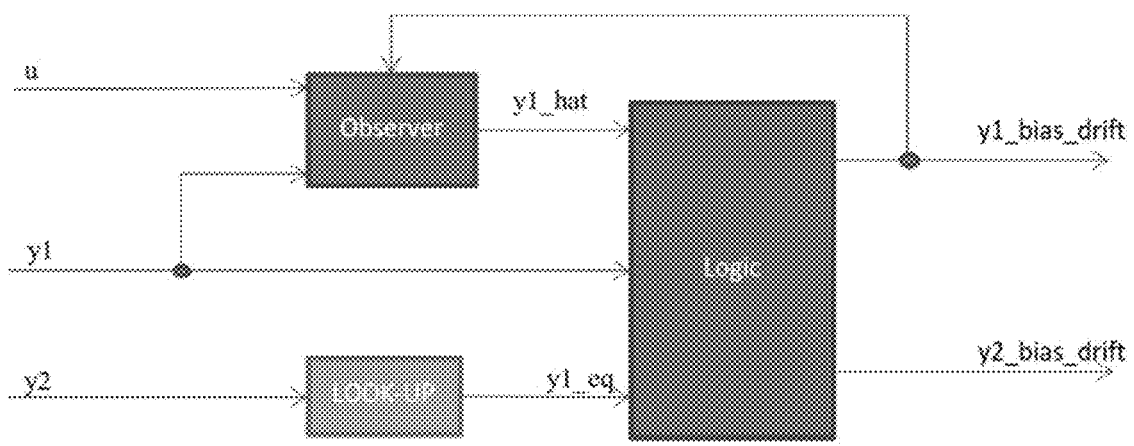
FIG. 6 is a block diagram which shows an embodiment of a system for computing at least one of a bias and a drift.

Now referring to FIG. 6, there is shown an embodiment of a system 600 for computing at least one of the bias and the drift. The system 600 for computing at least one of the bias and the drift comprises an observer 602, a lookup table 604 and a logic module 606.

The observer 602 is used for providing an estimation of the signal indicative of a displacement of the actuator y1.

More precisely, the observer 602 receives the control signal u, the signal indicative of a displacement of the actuator y1 and a signal indicative of at least one of a bias and a drift of the signal indicative of a displacement of the actuator y1 and provides the estimation of the signal indicative of a displacement of the actuator y1.

The lookup table 604 is used for establishing an equivalence between two measurements.

In the embodiment shown in FIG. 6, the lookup table 604 receives the signal indicative of a displacement of the surface y2 and provides a corresponding estimation of the signal indicative of a displacement of the actuator y1.

The logic module 606 is used for generating a signal indicative of at least one of a bias and a drift of the signal indicative of a displacement of the actuator y1 and a signal indicative of at least one of a bias and a drift of the signal indicative of a displacement of the surface y2. In fact, it will be appreciated that a comparison between the two measurements with the lookup table 606 enables the total bias present on the actuator sensor and on the surface position sensor to be determined. In one embodiment, the total bias is corrected to the load effect. It will be appreciated that the bias as well as the drift may be determined according to various alternative embodiments. For instance, a mathematical modelization may be used to determine the bias as well as the drift in the signal indicative of a displacement of the actuator y1 and in the signal indicative of a displacement of the surface y2.

It will be appreciated that the sensor monitoring unit 102 may be implemented according to various embodiments. In one embodiment, the sensor monitoring unit 102 is implemented using a Field Programmable Gate Arrays (FPGA) semiconductor. In another embodiment, the sensor monitoring unit 102 is implemented using a dedicated circuit. In another embodiment, the sensor monitoring unit 102 is implemented using a microcontroller. In another embodiment, the sensor monitoring unit 102 is implemented in software and is integrated in the Line Replaceable Unit 100 or elsewhere.

In the case of the embodiment disclosed in FIG. 3a, a sensor provides the signal indicative of a displacement of the system 300 y.

Now referring back to FIG. 1, it will be appreciated that the trigger unit 104 is used for determining if the signal indicative of a displacement of the actuator y1 is outside a given envelope of admissible values. It will be appreciated that such condition is indicative of a degradation or failure of at least one component of the actuator 114. It will be appreciated that the given envelope of admissible values is dynamically generated in one embodiment.

Still referring to FIG. 1, it will be appreciated that the trigger unit 104 receives the control signal u provided to the actuator 114, the signal indicative of a displacement of the actuator y1, the signal indicative of at least one of a bias and a drift of the signal indicative of a displacement of the actuator y1.

The trigger unit 104 further receives a signal indicative of an estimation of the parameters of the components of the actuator 114 from the memory unit 110. It will be appreciated that the trigger unit 104 further uses the mathematical model of the actuator 114.

As mentioned above, it will be appreciated that the envelope of admissible values where the position of the actuator 114 should be evolving is designed dynamically. In order to design the envelope of admissible values, a range of admissible values for each parameter corresponding to the at least one component to monitor is evaluated. Two mathematical models are built with the range of admissible values for each parameter as explained further below.

Figure 7:
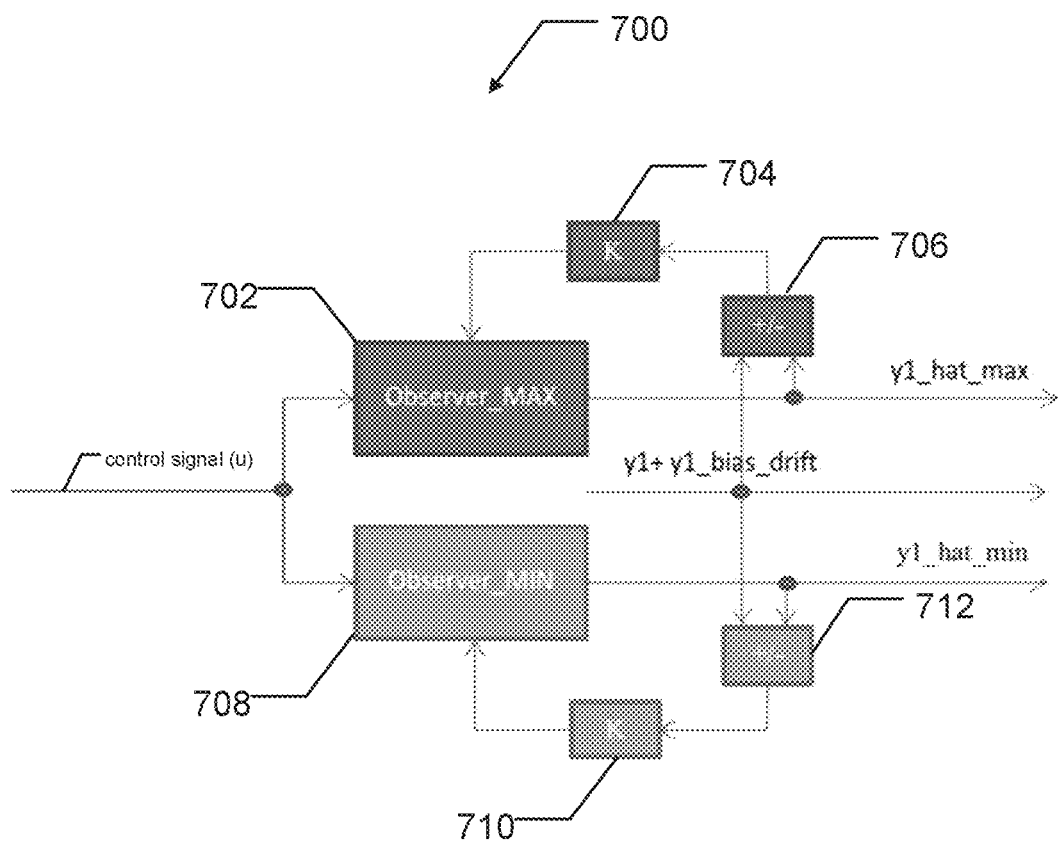
FIG. 7 is a block diagram which shows an embodiment of a unit for determining the envelope of admissible values for the signal indicative of a displacement of the actuator.

Now referring to FIG. 7, there is shown an embodiment of a unit 700 for determining the envelope of admissible values for the signal indicative of a displacement of the actuator y1 of the trigger unit 104.

The unit 700 for determining the envelope of admissible values for the signal indicative of a displacement of the actuator y1 comprises a min observer 708, a max observer 702, a first Kalman gain 704, a second Kalman gain 710, a first signal summing unit 706 and a second signal summing unit 712.

It will be appreciated that the max observer 702 uses the bounds of the range of admissible values for each parameter that maximize the signal indicative of a displacement of the actuator y1 while the min observer 708 uses the bounds of the range of admissible values for each parameter that minimize the signal indicative of a displacement of the actuator y1.

It will be appreciated by the skilled addressee that the min observer 708 and the max observer 702 may be designed according to various embodiments. In one embodiment, the min observer 708 and the max observer 702 are designed taking into account the specifications of the actuator's manufacturer, or/and with the objective to reduce false alarms due to noise measurement or disturbance on the system.

A Kalman gain, provided using the first Kalman gain 704 and the second Kalman gain 710, is used for controlling the amplitude of the envelope of admissible values for the signal indicative of the displacement of the actuator y1.

It will be appreciated that a trigger signal is generated and provided by the trigger unit 104 if the signal indicative of a displacement of the actuator y1 is outside the envelope of admissible values computed by the unit 700.

It will be appreciated that the trigger unit 104 may be implemented according to various embodiments. In one embodiment, the trigger unit 104 is implemented using a Field Programmable Gate Arrays (FPGA) semiconductor. In another embodiment, the trigger unit 104 is implemented using a dedicated circuit. In another embodiment, the trigger unit 104 is implemented using a microcontroller. In another embodiment, the trigger unit 104 is implemented in software and is integrated in the Line Replaceable Unit 100 or elsewhere. In a preferred embodiment, the trigger unit 104 is integrated in the Line Replaceable Unit 100.

It will be appreciated by the skilled addressee that various alternative embodiments may be possible for the trigger unit 104.

Now referring to FIG. 4, it will be appreciated that the trigger unit 404 receives the control signal u, the signal indicative of a displacement of the system 300 y and a signal indicative of an estimation of each of the system parameter of the system (i.e. k et D) from the memory unit 410.

The trigger unit 404 uses the mathematical model of the system 300.

The trigger unit 404 provides a corresponding trigger signal if the signal indicative of a displacement of the system 300 y is outside a computed envelope of admissible values for the signal indicative of a displacement of the system 300 y.

The envelope is computed using, inter alia, a range of admissible values of each parameter of the at least one component of the system 300 of the actuator. As mentioned previously, two mathematical models are built with these ranges to determine each boundary of the computed envelope of admissible values.

The skilled addressee will appreciate that various embodiments may be used for computing the envelope of admissible values.

Now referring back to FIG. 1, the system 112 for detecting, isolating and estimating a degradation of a corresponding component of an actuator further comprises a parameter and state estimation unit 106.

It will be appreciated that the parameter and state estimation unit 106 is used for estimating a value of each parameter and state of the actuator 114.

Figure 8:
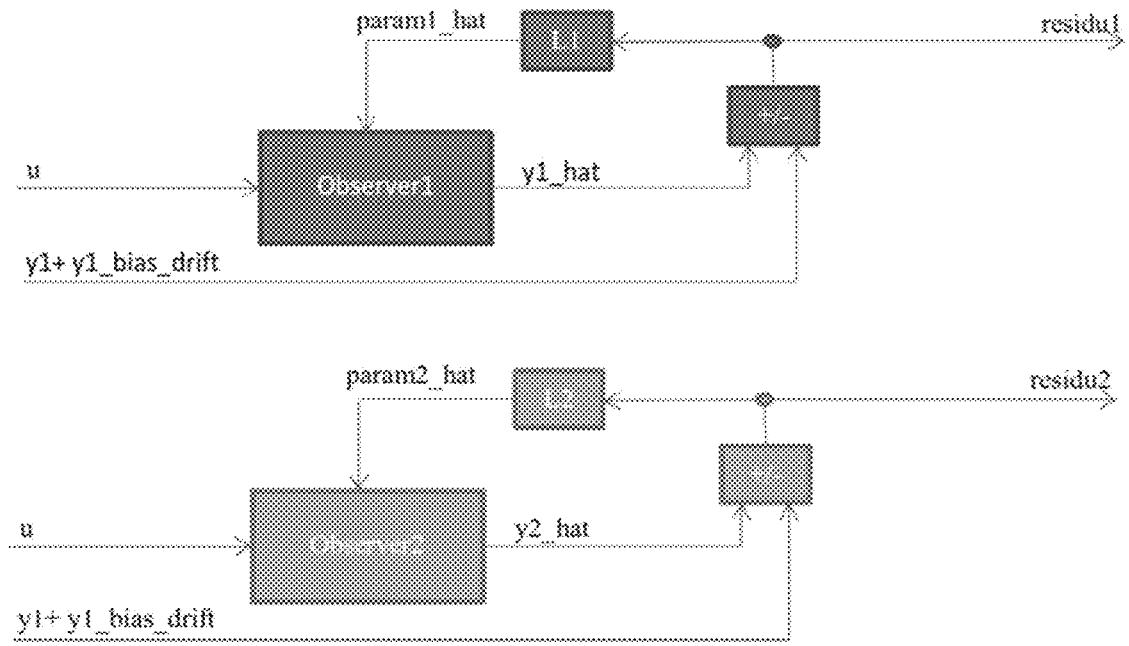
FIG. 8 is a block diagram which shows an embodiment of a parameter and state estimation unit.

Now referring to FIG. 8, there is shown an embodiment of the parameter and state estimation unit 106.

The parameter and state estimation unit 106 comprises in this embodiment a first observer unit comprising a first observer 802, a signal summing unit 806 and a filter 804. The first observer unit provides a corresponding residual estimation of a first corresponding parameter.

The parameter and state estimation unit 106 further comprises a second observer unit comprising a second observer 808, a signal summing unit 812 and a filter 810. The second observer unit provides a corresponding residual estimation of a second corresponding parameter.

It will be therefore appreciated that each observer unit provides a corresponding residual estimation for a given one of the at least one parameter and the at least one state of the actuator 114.

More precisely, the parameter and state estimation unit 106 receives the control signal u, the signal indicative of a displacement of the actuator y1, the signal indicative of at least one of a bias and a drift of the signal indicative of a displacement of the actuator y1 and a signal indicative of an estimation of each parameter of the actuator 114. The parameter and state estimation unit 106 further provides a signal indicative of a plurality of residual estimations for each parameter and state of the actuator 114.

It will be appreciated that the estimating of the value of each parameter and state of the actuator 114 may be performed according to various embodiments.

In one embodiment, a Kalman filter is used for estimating the states.

It will be appreciated that in the case of the actuator 114, the states comprise a servo actuator position, a servo actuation rate, a pressure in chamber 1, a pressure in chamber 2, an internal leakage between chamber 1 and chamber 2. In the embodiment of the system disclosed in FIG. 3a, the states are the position and the speed of the system 300.

It will be appreciated that the output of each observer unit is provided to the isolation unit 108 to isolate the degradation, if pertinent.

It will be appreciated by the skilled addressee that the parameter and state estimation unit 106 may be implemented according to various embodiments. In one embodiment, the parameter and state estimation unit 106 is implemented using a Field Programmable Gate Arrays (FPGA) semiconductor. In another embodiment, the parameter and state estimation unit 106 is implemented using a dedicated circuit. In another embodiment, the parameter and state estimation unit 106 is implemented using a microcontroller. In another embodiment, the parameter and state estimation unit 106 is implemented in software and is integrated in the Line Replaceable Unit 100 or elsewhere. In a preferred embodiment, the parameter and state estimation unit 106 is integrated in the Line Replaceable Unit 100.

Now referring back to FIG. 1, it will be appreciated that the isolation unit 108 is operatively connected to the parameter and state estimation unit 106 and to the trigger unit 104.

It will be appreciated that the isolation unit 108 is used for determining and for providing at least one of a corresponding parameter and a corresponding state of the actuator 114 responsible for the position of the actuator to be outside the given envelope.

In fact, it will be appreciated that if the trigger signal provided by the trigger unit 104 is true, the isolation unit 108 will use, in one embodiment, a generalized observers scheme (GOS) to determine which parameter degradation or what state caused the exit of the displacement of the actuator of the envelope of admissible values.

In fact, if the trigger signal is true and a residual estimation i (i=1 . . . n), wherein n is a number of parameter of the actuator, is lower than a predefined threshold and all the other residual estimations are greater than a predefined threshold, degradation of the parameter associated to the residual estimation i will be considered to be the cause of the exit of the displacement of the actuator of the envelope of admissible values.

After a predefined time confirmation, a degraded value of the corresponding parameter is provided and stored in the memory unit 110 and a signal indicative of a degradation of the corresponding component is provided.

It will be appreciated by the skilled addressee that the isolation unit 108 may be implemented according to various embodiments. In one embodiment, the isolation unit 108 is implemented using a Field Programmable Gate Arrays (FPGA) semiconductor. In another embodiment, the isolation unit 108 is implemented using a dedicated circuit. In another embodiment, the isolation unit 108 is implemented using a microcontroller. In another embodiment, the isolation unit 108 is implemented in software and is integrated in the Line Replaceable Unit 100 or elsewhere. In a preferred embodiment, the isolation unit 108 is integrated in the Line Replaceable Unit 100.

Now referring to FIG. 4, it will be appreciated that the isolation unit 406 receives the trigger signal from the trigger unit 404 and the signal indicative of a plurality of residual estimations from the parameter and state estimation unit 408.

It will be appreciated that the isolation unit 406 is used for determining and for providing at least one of a corresponding parameter and a corresponding state of the system 300 responsible for the position of the system 300 to be outside the given envelope of admissible values.

In fact, it will be appreciated that if the trigger signal provided by the trigger unit 404 is true, the isolation unit 406 will use a generalized observers scheme (GOS) to determine which parameter degradation or state caused the exit of the displacement of the actuator of the envelope of admissible values.

In fact, if the trigger signal is true and a residual estimation i (i=1 . . . n) is lower than a predefined threshold and all the other residual estimations are greater than a predefined threshold, degradation of the parameter associated to the residual estimation i is considered to be the cause of the exit of the system 300 position of the envelope of admissible values.

After a predefined time confirmation, a degraded value of the corresponding parameter is provided and stored in the memory unit 410 and a signal indicative of a degradation of the corresponding component is provided.

Figure 2:
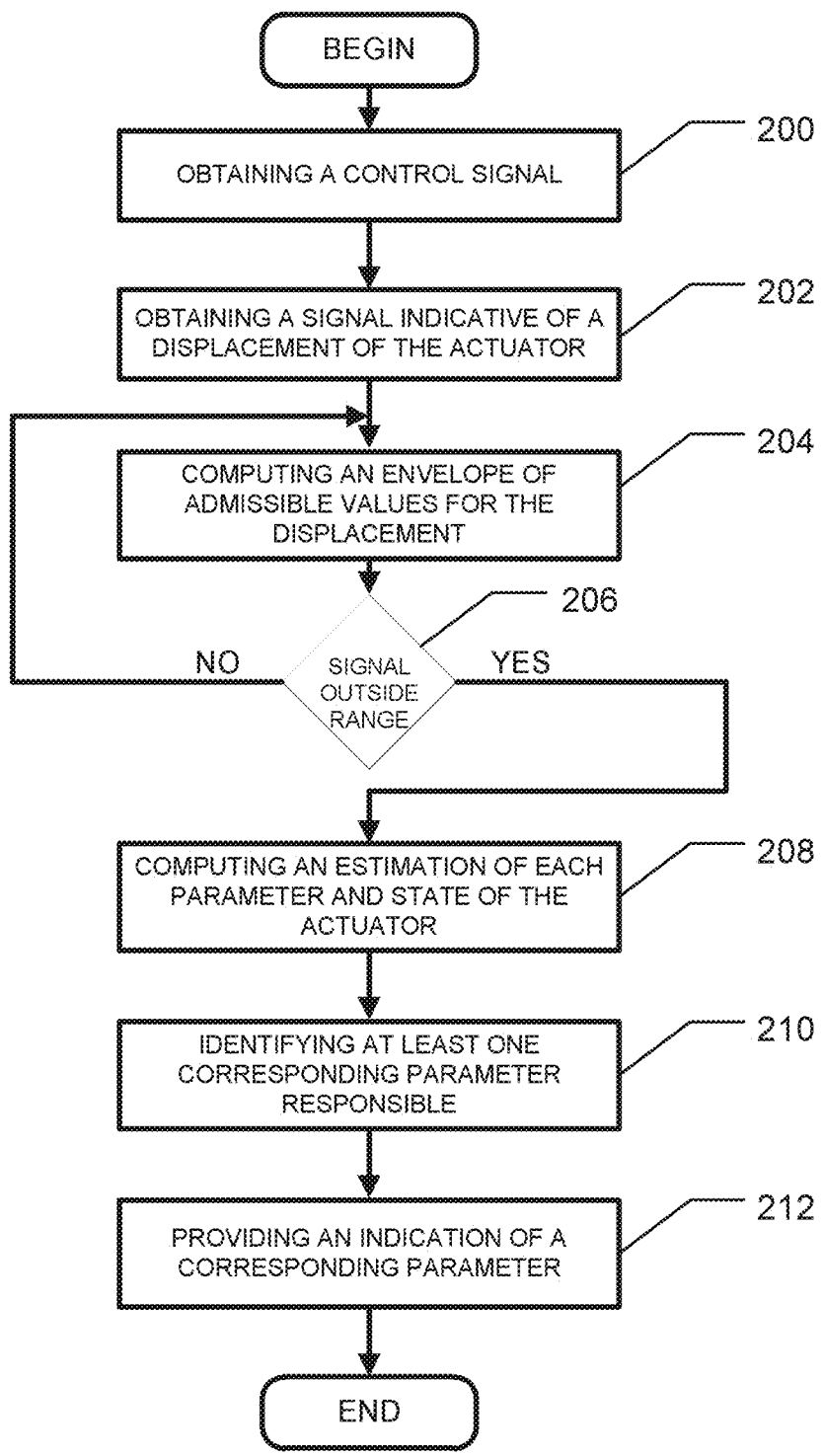
FIG. 2 is a flowchart which shows an embodiment of a method for detecting, isolating and estimating a degradation of a corresponding component of an actuator.

Now referring to FIG. 2, there is shown an embodiment of a method for detecting, isolating and estimating a degradation of a corresponding component of an actuator controlled by an actuator command signal.

According to processing step 200 a control signal is obtained. It will be appreciated that, in the case where the actuator is controlled in position, the control signal is a position control signal while, in the case where the actuator is controlled in speed, the control signal is a speed control signal.

According to processing step 202, a signal indicative of a displacement of the actuator is obtained.

In another embodiment a signal indicative of a displacement of a surface actuated by the actuator is further obtained.

According to processing step 204, an envelope of admissible values for the displacement of the actuator is computed. It will be appreciated that the envelope of admissible values for the displacement of the actuator may be computed according to various embodiments. It will be appreciated that the envelope of admissible values for the displacement of the actuator is computed dynamically.

According to processing step 206, a test is performed in order to find out of the actuator displacement is outside the computed envelope.

In the case wherein the actuator displacement is outside the computed enveloped and according to processing step 208, an estimation of each parameter and state of the actuator is computed. It will be appreciated that the estimation of each parameter and state of the actuator may be computed according to various embodiments as mentioned above.

According to processing step 210, at least one corresponding parameter responsible for causing the actuator displacement to be outside the computed envelope is identified.

According to processing step 212, an indication of the at least one corresponding parameter responsible for causing the actuator displacement to be outside the computed envelope is provided.

It will be appreciated that there is also disclosed a non-transitory computer readable storage medium for storing computer-executable instructions which, when executed, cause a computer to perform a method for detecting, isolating and estimating a degradation of a corresponding component of an actuator controlled by an actuator command signal, the method comprising obtaining a control signal of the actuator; obtaining a signal indicative of a displacement of the actuator; computing an envelope of admissible values for the displacement of the actuator; determining if the displacement of the actuator is outside the computed envelope and in the case where the displacement of the actuator is outside the computed enveloped: computing an estimation of each parameter and state of the actuator; identifying at least one corresponding parameter responsible for causing the actuator displacement to be outside the computer envelope; and providing an indication of the at least one corresponding parameter responsible for causing the displacement to be outside the computed envelope.

It will be appreciated that the method and the system 112 for detecting, isolating and estimating a degradation of a corresponding component of an actuator disclosed herein is of great advantage for various reasons.

More precisely, a first reason is that one or more embodiments of the method and the system for detecting, isolating and estimating a degradation of a corresponding component of an actuator provide an indication of a degradation of a component. It is therefore possible to anticipate a failure before it occurs, which is of great advantage.

A second reason is that one or more embodiments of the method and the system for detecting, isolating and estimating a degradation of a corresponding component of an actuator are not dependent on a specific actuator architecture and may be implemented for various types of architectures provided the mathematical model is known.

A third reason is that an estimated degradation of a corresponding component is logged and re-injected on all the mathematical models in order to adjust all the mathematical models accordingly.

Clause 1: A system for detecting, isolating and estimating a degradation of a corresponding component of an actuator controlled by an actuator command signal, the actuator providing a signal indicative of a displacement of said actuator, the system comprising:
  a memory unit for storing actuator parameter data;
  a sensor monitoring unit operatively connected to the memory unit and receiving the actuator command signal, the signal indicative of a displacement of said actuator, the sensor monitoring unit determining a presence of a given oscillation in the signal indicative of a displacement of said actuator;
  a trigger unit operatively connected to the sensor monitoring unit and to the memory unit and receiving the actuator command signal, the signal indicative of a displacement of said actuator; the trigger unit for computing an envelope of admissible values and for determining if the signal indicative of a displacement of said actuator is outside the computed envelope of admissible values;
  a parameter and state estimation unit operatively connected to the sensor monitoring unit and to the memory unit and further receiving the actuator command signal, the signal indicative of a displacement of said actuator; the parameter and state estimation unit for estimating each corresponding parameter and state of the actuator;
  an isolation unit operatively connected to the parameter and state estimation unit and to the trigger unit, the isolation unit for determining and for providing at least one parameter of the actuator responsible for the displacement of said actuator to be outside the given envelope of admissible values; and
  further wherein the memory unit is updated with a value of the at least one corresponding parameter responsible for the displacement of said actuator to be outside the given envelope of admissible values.

Clause 2: The system as claimed in clause 1, wherein the actuator further provides a signal indicative of a displacement of a surface actuated by the actuator; further wherein the sensor monitoring unit receives the signal indicative of a displacement of a surface actuated by the actuator and determines a presence of a given oscillation in the signal indicative of a displacement of a surface actuated by the actuator and at least one of a bias and a drift in at least one of the signal indicative of a displacement of the actuator and the signal indicative of a displacement of a surface actuated by the actuator.

Clause 3: The system as claimed in any one of clauses 1 to 2, wherein the envelope of admissible values is computed dynamically.

Clause 4: The system as claimed in any one of clauses 1 to 3, wherein the actuator is selected in a group consisting of electro hydraulic servo actuators (EHSA) and electric backup hydraulic actuators (EBNA).

Clause 5: The system as claimed in any one of clauses 1 to 4, wherein the actuator is comprised of a sensor further wherein the system is used for determining a degradation of the sensor.

Clause 6: A system for detecting, isolating and estimating a degradation of a corresponding component of an actuator controlled by an actuator command signal, the actuator providing a signal indicative of a displacement of said actuator and a signal indicative of a displacement of a surface actuated by the actuator, the system comprising:
  a memory unit for storing actuator data;
  a sensor monitoring unit operatively connected to the memory unit and receiving the actuator command signal, the signal indicative of a displacement of said actuator and the signal indicative of a displacement of a surface actuated by the actuator, the sensor monitoring unit determining a presence of a given oscillation in at least one of the actuator command signal, the signal indicative of a displacement of said actuator and the signal indicative of a displacement of a surface actuated by the actuator as well as at least one of a bias and a drift in at least one of the signal indicative of a displacement of said actuator and the signal indicative of a displacement of a surface actuated by the actuator;
  a trigger unit operatively connected to the sensor monitoring unit and to the memory unit and receiving the actuator command signal, the signal indicative of a displacement of said actuator and the signal indicative of a displacement of a surface actuated by the actuator; the trigger unit for determining if a position of the actuator is outside a given envelope of admissible values;
  at least one estimated parameter unit, each of the at least one estimated parameter unit operatively connected to the sensor monitoring unit and to the memory unit and further receiving the actuator command signal, the signal indicative of a displacement of said actuator, the signal indicative of a displacement of a surface actuated by the actuator; each estimated parameter unit for estimating one of a corresponding parameter or a state of the actuator;
  an isolation unit operatively connected to each of the at least one estimated parameter unit and to the trigger unit, the isolation unit for determining and for providing at least one of a corresponding parameter and a corresponding state of the actuator responsible for the position of the actuator to be outside the given envelope; and
  further wherein the memory unit is updated with a value of the at least one of a corresponding parameter and a corresponding state of the actuator responsible for the position of the actuator to be outside the given envelope.

Clause 7: A method for detecting, isolating and estimating a degradation of a corresponding component of an actuator controlled by an actuator command signal, the method comprising:
obtaining a control signal of the actuator;
obtaining a signal indicative of a displacement of the actuator;
computing an envelope of admissible values for the displacement of the actuator;
determining if the displacement of the actuator is outside the computed envelope;
in the case where the displacement of the actuator is outside the computed enveloped:
computing an estimation of each parameter and state of the actuator;
identifying at least one corresponding parameter responsible for causing the actuator displacement to be outside the computer envelope; and
providing an indication of the at least one corresponding parameter responsible for causing the displacement to be outside the computed envelope.

Clause 8: The method as claimed in clause 7, wherein the actuator is controlled in position; further wherein the control signal is a position control signal.

Clause 9: The method as claimed in clause 7, wherein the actuator is controlled in speed; further wherein the control signal is a speed control signal.

Clause 10: The method as claimed in any one of clauses 7 to 9, wherein a signal indicative of a displacement of a surface actuated by the actuator is further obtained.

Clause 11: The method as claimed in any one of clauses 7 to 10, wherein the computing of the envelope of admissible values for the displacement of the actuator is performed dynamically.

Clause 12: A non-transitory computer readable storage medium for storing computer-executable instructions which, when executed, cause a computer to perform a method for detecting, isolating and estimating a degradation of a corresponding component of an actuator controlled by an actuator command signal, the method comprising:
obtaining a control signal of the actuator;
obtaining a signal indicative of a displacement of the actuator;
computing an envelope of admissible values for the displacement of the actuator;
determining if the displacement of the actuator is outside the computed envelope;
in the case where the displacement of the actuator is outside the computed enveloped:
computing an estimation of each parameter and state of the actuator;
identifying at least one corresponding parameter responsible for causing the actuator displacement to be outside the computer envelope; and
providing an indication of the at least one corresponding parameter responsible for causing the displacement to be outside the computed envelope.

Although the above description relates to one or more embodiments as presently contemplated by the inventor, it will be understood that the invention in its broad aspect includes functional equivalents of the elements described herein.

The invention claimed is:

1. A system for dynamically detecting, isolating and estimating a degradation of a corresponding component of an actuator controlled by an actuator command signal, the actuator providing a signal indicative of a displacement of said actuator, the system comprising:
a non-transitory storage medium configured for storing actuator parameter data and at least one model of components of the actuator, each component being associated with a corresponding parameter in the actuator parameter data;
a sensor monitoring unit operatively connected to the non-transitory storage medium, the sensor monitoring unit being configured for:
receiving the actuator command signal, the signal indicative of the displacement of said actuator; and
determining a presence of a given oscillation in the signal indicative of the displacement of said actuator by using the at least one model of the components of the actuator based on the signal indicative of displacement of the actuator and the actuator command signal;
a trigger unit operatively connected to the sensor monitoring unit and to the non-transitory storage medium, the trigger unit being configured for:
receiving the actuator command signal, and the signal indicative of the displacement of said actuator;
dynamically computing an envelope of admissible values for the signal indicative of the displacement of said actuator using the at least one model of the components of the actuator; and
determining if the signal indicative of the displacement of said actuator is outside the envelope of admissible values;
in response to the signal indicative of the displacement of the actuator being outside the computed envelope of admissible values, generating a trigger signal;
a parameter and state estimation unit operatively connected to the sensor monitoring unit and to the non-transitory storage medium, the parameter and state estimation unit being configured for:
receiving the actuator command signal and the signal indicative of the displacement of said actuator; and
estimating each corresponding parameter and state of the actuator using the at least one model of the components of the actuator to obtain a signal indicative of a plurality of residual estimations for each corresponding parameter and state of the actuator;
an isolation unit operatively connected to the parameter and state estimation unit and to the trigger unit, the isolation unit being configured for:
receiving the trigger signal;
receiving the signal indicative of the plurality of residual estimations for each corresponding parameter and state of the actuator; and
determining at least one parameter of the actuator responsible for the displacement of said actuator to be outside the envelope of admissible values based on the trigger signal and the signal indicative of the plurality of residual estimations for each corresponding parameter and state of the actuator; and
updating the at least one model with a value of the at least one corresponding parameter responsible for the displacement of said actuator to be outside the envelope of admissible values in the non-transitory storage medium.

2. The system as claimed in claim 1,
wherein the sensor monitoring unit is further configured for:
receiving a signal indicative of a displacement of a surface actuated by the actuator; and and determining at least one of a bias and a drift in at least one of: the signal indicative of a displacement of the actuator and the signal indicative of a displacement of a surface actuated by the actuator.

3. The system as claimed in claim 1, wherein the isolation unit is configured for dynamically computing the envelope of admissible values using respective models based on respective ranges of admissible values for each respective parameter.

4. The system as claimed in claim 1, wherein the actuator comprises one of: electro hydraulic servo actuators (EHSA) and electric backup hydraulic actuators (EBHA).

5. The system as claimed in claim 1, wherein the actuator is associated with a sensor further wherein the system is configured for determining a degradation of the sensor.

6. A method for dynamically detecting, isolating and estimating a degradation of a corresponding component of an actuator controlled by an actuator command signal, the method being executed by at least one processor, the at least one processor having access to at least one model of components of the actuator using actuator parameter data, each component being associated with a corresponding parameter in the actuator parameter data, the method comprising:
   obtaining a control signal of the actuator;
   obtaining a signal indicative of a displacement of the actuator;
   dynamically computing an envelope of admissible values for the signal indicative of the displacement of the actuator;
   determining if the signal indicative of the displacement of the actuator is outside the computed envelope of admissible values using the at least one model of the components of the actuator;
   in the case where the displacement of the actuator is outside the computed envelope:
      computing, using the at least one model, an estimation of each parameter and state of the actuator;
      identifying at least one corresponding parameter responsible for causing the signal indicative of the displacement of the actuator to be outside the computed envelope of admissible values; and
      updating the at least one model with a value of the at least one corresponding parameter responsible for causing the displacement to be outside the computed envelope.

7. The method as claimed in claim 6, wherein the control signal is a position control signal.

8. The method as claimed in claim 6, wherein the control signal is a speed control signal.

9. The method as claimed in claim 6, further comprising obtaining a signal indicative of a displacement of a surface actuated by the actuator.

10. The method as claimed in claim 6, wherein the dynamically computing of the envelope of admissible values for the displacement of the actuator is performed using respective models based on respective ranges of admissible values for each respective parameter.

11. A non-transitory computer readable storage medium for storing computer-executable instructions which, when executed, cause a computer processor to perform:
   obtaining at least one model of the components of the actuator using the actuator command signal and actuator parameter data, each component being associated with a corresponding parameter in the actuator parameter data;
   obtaining a control signal of the actuator;
   obtaining a signal indicative of a displacement of the actuator;
   computing an envelope of admissible values for the signal indicative of the displacement of the actuator;
   determining if the displacement of the actuator is outside the computed envelope;
   in the case where the displacement of the actuator is outside the computed enveloped:
      computing, using the at least one model of the components of the actuator, an estimation of each parameter and state of the actuator;
      identifying at least one corresponding parameter responsible for causing the actuator displacement to be outside the computed envelope of admissible values; and
      updating the at least one model with a value of the at least one corresponding parameter responsible for causing the displacement to be outside the computed envelope.

* * * * *